Patented June 13, 1950

2,511,096

UNITED STATES PATENT OFFICE 2,511,096

PRODUCTION OF CELLULOSE

Stanley Charles Bate, Spondon, near Derby, England, assignor, by mesne assignments, to Celanese Corporation of America, a corporation of Delaware No Drawing. Application October 11, 1944, Serial No. 558,287. In Great Britain November 5, 1943

9 Claims. (Cl. 92—9)

This invention relates to the production of cellulose from ligno-cellulosic materials.

In U. S. Patent No. 2,183,643 of Henry Dreyfus there is described a process for producing cellulose, in which ligno-cellulosic material such as wood, straw, grass and the like are treated with a mixture of aqueous acetic acid and nitric acid. The amount of nitric acid is preferably above 15%, for example between 15% and 30% of the weight of the ligno-cellulosic material, and the amount of aqueous acetic acid may be at least ten times, and preferably 15, 20, or 25 times, the weight of the ligno-cellulosic material. The treatment with acetic and nitric acids is followed by a treatment with an alkali solution, preferably a hot dilute alkali solution.

I have now found that the amount of nitric acid employed in a process of this kind may be considerably reduced, for example by about half in the process described in U. S. Patent No. 2,183,634 if an oxidising gas, especially free oxygen, is passed through the mixture of acids during the treatment of the ligno-cellulosic material.

According to the present invention therefore, ligno-cellulosic materials are heated with a mixture of an aqueous lower aliphatic acid and nitric acid through which an oxidising gas is passed. Preferably the oxidising gas comprises free oxygen. Thus air may be passed through the mixture of the acids, but the higher the proportion of free oxygen in the gas the more efficient is the reaction, and I therefore prefer to use oxygen itself in a more or less pure state.

The ligno-cellulosic material is preferably treated in a state of fine sub-division. For example, wood may be treated in the form of small chips, sawdust or wood wool; and straw may be finely chopped up before treatment. The action of the lower aliphatic and nitric acids is assisted if the ligno-cellulosic material is first subjected to a treatment with a dilute alkali solution; for example it may be given an open boil with a 1% caustic soda solution for between 30 minutes and two hours.

The oxidising gas is preferably introduced into the acid mixture in the form of fine bubbles at a level below the ligno-cellulosic material, and in such a way that the gas comes into contact with as much of the material as possible. For example the gas may be caused to pass through a plate, finely perforated over the whole of its area, situated below the ligno-cellulosic material. Furthermore, the acid mixture containing the ligno-cellulosic material may be stirred or otherwise agitated continuously or intermittently throughout the treatment so as to achieve as uniform a reaction as possible.

The total amount of the acid mixture employed should be at least 5 times the weight of the ligno-cellulosic material being treated, and I prefer to use at least 8 times this weight; for example for every pound or ligno-cellulosic material I may employ 8, 10, 15 or 20 pounds or more of the acid mixture.

The aqueous lower aliphatic acid used may with advantage be aqueous acetic acid of concentration between 50 and 90%, and especially between 70 and 75%, but other acids, e. g. propionic acid of similar concentration, may be used. The concentration of nitric acid in the acid mixture depends partly on the amount of the acid mixture which is used, since the ratio of the weight of nitric acid to the weight of ligno-cellulosic material appears to be more important than the actual concentration of nitric acid in the mixture. Thus for example the amount of nitric acid in the acid mixture may be between 3 and 20% of the original air-dry weight of the ligno-cellulosic material, i. e. the air-dry weight of the material before it undergoes any preliminary treatment such as the boil with dilute alkali which has already been described. Different ligno-cellulosic materials may require different amounts of nitric acid to give the best results. Thus when treating deciduous woods, good results have been obtained by using 8 or 12% of nitric acid. Coniferous woods, e. g. spruce or fir, usually require more nitric acid, for instance between 12 and 16% or more. Straw which has been given a boil with dilute alkali requires even less nitric acid than do deciduous woods, for example between 3 and 6%, but if the boil with dilute alkali is omitted, more nitric acid, preferably 10-12% of the original air-dry weight of the straw, should be used.

In order that the treatment of the ligno-cellulosic materials may proceed at an economic rate, it is preferable to work at temperatures not lower than about 70° C.; preferably temperatures between 80° and 110° C., and especially between 90° and 100° C., are employed. Such temperatures can be employed without generating a pressure higher than atmospheric, in contrast to the usual high pressure pulping treatments with sulphite, sulphate or soda liquors. The time required for the treatment of the ligno-cellulosic material will, of course, vary to some extent with the material being treated, but usually the reaction is substantially completed after 5 or 6 hours at the most.

When the action of the mixture of acids and the oxidising gas on the ligno-cellulosic materials is substantially complete, the mixture may be cooled, and the solid material separated from the liquid, for example by filtration. The solid material is preferably washed until it is free from both the lower aliphatic acid and the nitric acid. Advantageously it is washed first with dilute acetic acid and then with warm water until the washings no longer contain acid. The liquid, consisting mainly of the aqueous lower aliphatic acid, may be used again, after adding the necessary amount of fresh nitric acid, for the treatment of further quantities of ligno-cellulosic material.

As a result of the treatment with the mixture of acids and the oxidising gas, there are formed in the ligno-cellulosic material oxidation products of lignin which are readily soluble in alkali. Following this treatment therefore, the ligno-cellulosic material is subjected to treatment with alkali in order to remove these oxidation products from the unoxidised part of the ligno-cellulosic complex. For example the material, after having been separated and washed free from acid, may be boiled under atmospheric pressure with between 8 and 15 times its weight of a caustic soda solution of concentration between about 0.25 and 2%, and especially between 0.5 and 1%. A comparatively short period at the boiling point of the solution, usually between about 30 and 60 minutes, is sufficient to dissolve the oxidation products of the lignin; after this the hot alkali solution may be run off and the material washed, e. g. with hot water.

It will be obvious that the nitric acid need not initially be present as the free acid, since a compound which is capable of furnishing nitric acid under the reaction conditions is, for the purpose of the present process, equivalent to free nitric acid. Such a compound may furnish all the nitric acid required as soon as it is mixed with the lower aliphatic acid, or it may furnish a small proportion of nitric acid which is constantly renewed as the nitric acid is used up in the reaction. Examples of suitable compounds are nitrates of metals, especially nitrate of metals which are weakly or only moderately strongly basic; for instance a nitrate of copper, iron or manganese may be used with or without a proportion of free nitric acid; if desired, however, nitrates of more strongly basic metals, e. g. the alkaline earth metals or even of a strongly basic metal such as sodium or potassium, may be used, though with less advantage. The amounts of these compounds which may be used are such as are stoichiometrically equivalent to the amount of free nitric acid which they replace. The reaction conditions already set out are suitable whether the nitric acid is initially present as the free acid or as a compound from which the acid can be derived under the reaction conditions.

Crude cellulose obtained by the new process may be subjected to any desired purification treatment. It usually still contains a considerable proportion of pentosans, the exact amount depending among other things on the nature of the starting materials, and such pentosans may be removed for the most part by treatment with a more concentrated alkali solution in the cold, for example a treatment with caustic soda of concentration between about 7 and 25%, and especially between 9 and 15%. This treatment with a concentrated cold alkali solution may, if desired, be repeated two or more times, and the materials may also be given one or more further treatments with dilute alkali, e. g. alkali of concentration between 0.5 and 2%, at elevated temperatures. Examples of such treatments are given in British Patent Specification No. 442,020 of Henry Dreyfus.

Before and/or after the alkali purification treatments the material may be bleached, for example with a hypochlorite solution under acid or alkaline conditions, or with a solution of sodium chlorite or some other suitable bleaching agent. Cellulose obtained by the process of the invention and purified by bleaching and treatment first with a cold concentrated alkali solution and then with a hot dilute alkali solution as described above has a high alpha-cellulose content and a low pentosan content, and may be converted into cellulose esters or ethers of good quality, or used for the production of viscose or cuprammonium solutions, by the usual methods.

The following examples illustrate the invention:

Example 1

Elm sawdust was boiled with a 1% solution of caustic soda, washed, and dried in the air. The product was heated to 90–95° C. in 10 times its weight of 70% aqueous acetic acid containing 1% of nitric acid, the amount of nitric acid being approximately 8% of the air-dry weight of the sawdust before the treatment with the alkali. Throughout the treatment with the acetic acid and nitric acid a current of substantially pure oxygen was passed through the mixture of acids. After about 5 hours the treatment was stopped and the ligno-cellulosic material was separated from the mixture of acids by filtration and washed first with dilute acetic acid and then with water. The material was then boiled for half an hour with a 0.5% solution of caustic soda. The crude cellulose so obtained was bleached with a calcium hypochlorite solution, and purified by treatment with a 12% solution of caustic soda in the cold followed by a final boil with a 1% solution of caustic soda. The product, after being washed free from alkali, contained 94.5% of alpha-cellulose.

If air instead of pure oxygen was passed through the mixture of acids a slightly lower yield of a product containing 93.8% of alpha-cellulose was obtained.

Example 2

Scotch fir sawdust was treated in the same way as the elm sawdust in Example 1, except that the amount of nitric acid employed was 13.5% of the air-dry weight of the sawdust. The product had an alpha-cellulose content of 94.0%.

Example 3

Chopped straw was suspended in 14.5 times its weight of 70% aqueous acetic acid containing 0.8% of nitric acid, corresponding to an amount of nitric acid equal to 11.6% of the air-dry weight of the straw. The mixture was heated to 90–95° C. and a current of air continuously passed through. After 4 hours the acid mixture was filtered off from the ligno-cellulosic material, which was washed with water until free from acid and was then boiled with a 1% solution of caustic soda. The crude cellulose so obtained was bleached with calcium hypochlorite and then subjected to the further purification treatment described in Example 1. A product containing about 95% of alpha-cellulose was obtained.

Example 4

Chopped straw was boiled for one hour with 10 times its weight of a 1% solution of caustic soda, filtered off and washed free from alkali, and dried. The product so obtained, amounting to about 67% of the original weight of the straw, was suspended in 10 times its weight of 70% aqueous acetic acid containing 0.6% of nitric acid, corresponding to an amount of nitric acid equal to 4% of the original weight of the straw. The mixture was then heated to 90–95° C. for 4 hours while a current of air was passed through. The solid product was then separated, washed and treated as described in Example 3. A product having an alpha cellulose content of about 95.6% was obtained.

In Examples 3 and 4 the product is slightly improved if substantially pure oxygen is passed through the mixture of acids instead of air.

Example 5

Elm sawdust was boiled for half an hour with a 1% solution of caustic soda, filtered and washed free from alkali and dried. It was then suspended in 10 times its original weight of 70% aqueous acetic acid containing in solution copper nitrate in amount about 15% of the weight of the original sawdust. The mixture was heated to 90–95° C. for 5–6 hours and a current of oxygen was passed through. The solid product remaining was then filtered off, washed, boiled with alkali, bleached, and given a further purification treatment with alkali, all as described in Example 1. The final product contained about 92% alpha-cellulose. If no oxidising gas was passed through the mixture the alpha-cellulose content of the final product was lower.

Having described my invention, what I desire to secure by Letters Patent is:

1. In a process for producing cellulose from ligno-cellulosic materials by digesting the materials between 70° and 110° C. for at most 6 hours with 5–20 times their weight of a mixture of nitric acid and aqueous acetic acid and subsequently washing the materials with alkali to dissolve therefrom lignin-oxidation products, the improvement which consists in employing the nitric acid in amount 3–20% of the air-dry weight of the materials and the aqueous acetic acid in a concentration of 50–90%, and passing oxygen through the slurry of mixed acids and cellulosic material.

2. In a process for producing cellulose from deciduous wood by digesting the materials between 70 and 110° C. for at most 6 hours with 5–20 times their weight of a mixture of nitric acid and aqueous acetic acid and subsequently washing the materials with alkali to dissolve therefrom lignin-oxidation products, the improvement which consists in employing the nitric acid in amount 8–12% of the air-dry weight of the materials and the aqueous acetic acid in a concentration of 50–90%, and passing oxygen through the slurry of mixed acids and cellulosic material.

3. In a process for producing cellulose from coniferous wood by digesting the materials between 70 and 110° C. for at most 6 hours with 5–20 times their weight of a mixture of nitric acid and aqueous acetic acid and subsequently washing the materials with alkali to dissolve therefrom lignin-oxidation products, the improvement which consists in employing the nitric acid in amount 12–16% of the air-dry weight of the materials and the aqueous acetic acid in a concentration of 50–90%, and passing oxygen through the slurry of mixed acids and cellulosic material.

4. In a process for producing cellulose from straw which has been boiled with a dilute caustic alkali solution by digesting the straw at a temperature between 70 and 110° C. for at most 6 hours with 5–20 times its weight of a mixture consisting of nitric acid and aqueous acetic acid and subsequently washing the straw with alkali to dissolve therefrom lignin-oxidation products, the improvement which consists in employing the nitric acid in amount 3–6% of the air-dry weight of the straw taken before the dilute caustic alkali boil, and the aqueous acetic acid in a concentration of 50–90%, and passing oxygen through the slurry of mixed acids and straw.

5. Process according to claim 1, wherein the concentration of the acetic acid is 70–75%.

6. Process according to claim 1, wherein the treatment with the mixture of acids is effected at a temperature of 90–100° C.

7. Process according to claim 1, wherein the oxygen is passed through the slurry in the form of air.

8. Process according to claim 1, wherein the resulting product is bleached and then subjected to successive treatments with a cold 9–15% aqueous caustic alkali solution and a boiling 0.5–2% aqueous caustic alkali solution respectively.

9. Process according to claim 1, in which the nitric acid is produced in contact with the material by boiling the material with aqueous acetic acid containing a nitrate of a metal selected from the group which consists of iron, manganese and copper.

STANLEY CHARLES BATE.

REFERENCES CITED

The following references are of record in the file of this patent:

UNITED STATES PATENTS

| Number | Name | Date |
|---|---|---|
| 845,378 | Stewart | Feb. 26, 1907 |
| 1,736,080 | Helmann | Nov. 19, 1929 |
| 1,975,161 | Kipper | Oct. 2, 1934 |
| 1,987,195 | Kipper | Jan. 18, 1935 |
| 2,005,190 | Kipper | June 18, 1935 |
| 2,183,643 | Dreyfus | Dec. 19, 1939 |
| 2,214,125 | Dreyfus | Sept. 10, 1940 |
| 2,299,132 | Dreyfus | Oct. 20, 1942 |
| 2,394,989 | Dreyfus | Feb. 19, 1946 |

FOREIGN PATENTS

| Number | Country | Date |
|---|---|---|
| 465,732 | France | Apr. 23, 1914 |

OTHER REFERENCES

Ind. & Eng. Chem., vol. 30, pp. 1192–1198, 1938.
Paper World, pp. 44, 45, and 47, April 1939.
Paper World, pp. 335–343, June 1939.

Certificate of Correction

Patent No. 2,511,096 June 13, 1950

STANLEY CHARLES BATE

It is hereby certified that errors appear in the printed specification of the above numbered patent requiring correction as follows:

Column 1, line 21, for the patent number "2,183,634" read *2,183,643*; column 2, line 7, for "pound or" read *pound of*;

and that the said Letters Patent should be read with these corrections therein that the same may conform to the record of the case in the Patent Office.

Signed and sealed this 12th day of September, A. D. 1950.

[SEAL]

THOMAS F. MURPHY,
*Assistant Commissioner of Patents.*